United States Patent [19]

Butler

[11] 4,401,290

[45] Aug. 30, 1983

[54] STABILIZED SEAT

[75] Inventor: Jack B. Butler, Kilgore, Tex.

[73] Assignee: 4-S Oil Company, Inc., Kilgore, Tex.

[21] Appl. No.: 246,850

[22] Filed: Mar. 23, 1981

[51] Int. Cl.³ .............................................. F16M 13/00
[52] U.S. Cl. ................................... 248/565; 248/560;
248/566; 248/580
[58] Field of Search ............... 248/560, 565, 566, 569,
248/580

[56] References Cited

U.S. PATENT DOCUMENTS

| | | | |
|---|---|---|---|
| 1,711,085 | 4/1929 | D'Arcy | 248/560 |
| 1,897,014 | 2/1933 | Trott | 298/580 |
| 1,902,631 | 3/1933 | Flintermann | 248/580 |
| 2,368,727 | 2/1945 | Robinson | 248/580 |
| 2,597,800 | 5/1952 | Hussman | 248/580 |
| 2,892,482 | 6/1959 | Beoletto | 248/565 |
| 3,193,239 | 7/1965 | Monroe | 248/566 |

FOREIGN PATENT DOCUMENTS 209923  1/1924  United Kingdom ............... 248/580

*Primary Examiner*—James T. McCall
*Attorney, Agent, or Firm*—Harvey B. Jacobson

[57] ABSTRACT

A seat secured to a permanent floor by a seat stabilizer which provides increased comfort by absorbing the static shock and/or vibration created between the permanent structure and the seat cushion. The seat stabilizer comprises a plurality of steel bolts firmly supported in the permanent floor structure, each bolt being enclosed by a coil spring contacting the permanent floor structure and the seat cushion frame positioned around each bolt, thereby causing the seat cushion to float vertically along the bolt in response to sudden shocks or vibrations. A bushing mounted on the portion of each seat frame contacting the stabilizing bolts prevents wear due to the vertical movement of the floating seat cushion frame. The stabilizing bolts and associated spring are enclosed by an elastic boot thereby eliminating dust particles and the corrosive effects of the environment.

4 Claims, 4 Drawing Figures

STABILIZED SEAT

BACKGROUND OF THE INVENTION

1. Field of the Invention

This invention relates to a stabilized seat and, in particular, to a seat stabilizer provided in association with the seat structures of automobiles, trucks, aircraft, watercraft, home furniture, etc., for the purpose of increasing comfort by absorbing the static shock and/or vibration created between the permanent lower support structure for the seat and the upper seat cushion.

2. Disclosure Statement

Attempts to improve seat comfort have in the past included the substitution of new materials for seat coverings, the addition of internal coil springs in the cushion element, improvements in the kinds of cushion elements and arrangements of the internal coil springs within the cushion elements. While some attempts to increase seating comfort have succeeded, there is still a considerable need for a comfortable seat, and, in particular, for a comfortable seat which is positioned in an air, land or water vehicle which often encounters sudden shocks and moderate to severe vibrations. While present vehicle seat structures may provide a sufficient degree of comfort during uneventful travel, rider comfort can be suddenly changed due to sudden movements of the vehicle or even during longer periods of moderate vibrations.

In an attempt to provide seating comfort, patented vehicle seats have incorporated springs in the seat back and have attached such springs to a floating seat frame thereby dampening vibrations produced during movement of the vehicle. U.S. Pat. Nos. 1,905,588, issued Apr. 25, 1933, and 2,149,290, issued Mar. 7, 1939, both to Harris, disclose such a configuration. U.S. Pat. No. 1,821,417, issued Sept. 1, 1931, to Bounds, discloses an automobile seat in which springs are provided in the seat back for permitting yielding movement of the back relative to the seat cushion.

The stabilized seat and novel seat stabilizer of the present invention are of a construction unlike that of the three above-mentioned patents. The seat stabilizer of the present invention is preferably an external component of the seat securely attached to the floor structure.

SUMMARY OF THE INVENTION

Briefly, this invention provides a novel seat stabilizer for vehicle seats comprising a vibration dampening means securely mounted to the vehicle floor and engaged with the seat cushion support frame of the vehicle seat so as to allow the seat cushion to float vertically with respect to the vehicle floor. The vibration dampening means includes a support rod mounted to the permanent floor of the vehicle and a coil spring positioned around the support rod and resiliently supporting the seat cushion support frame for vertical oscillatory movement along the support rod whereby any shock or vibration transmitted through the vehicle floor to the seat is absorbed by the vibration dampening means and transmitted into the floating vertical movement of the seat. The seat stabilizer preferably comprises a plurality of the vibration dampening means positioned about the perimeter of the seat support frame. Each vibration dampening means is enclosed within an elastic rubber boot to eliminate dust particles and other solid particulates and thus reduce wear of the moving components as well as eliminating or greatly reducing the corrosive effects of the environment. A bushing installed in the floating seat support frame is also provided to prevent wear caused by the oscillating movement of the support frame along the support rod. The present invention provides alternative seat stabilizing means for mounting a seat on a flat floor surface as well as a floor containing a seat stabilizer recess, respectively. Both forms of the seat stabilizer relay principally on the same method of operation.

Accordingly, it is the primary object of the present invention to prevent or retard an unwanted alteration of the physical state due to sudden shock or vibration.

Another object of the present invention is to provide a stabilized seat for land, air and water vehicles with increased riding or seating comfort by absorbing static shock and/or vibration generated between the permanent lower structure and the seat.

Another object of the invention is to provide a vehicle seat with increased seating or riding comfort by mounting the seat on a novel stabilizing mechanism which dampens sudden shock and vibrations.

Still another object of the present invention is to provide a novel seat stabilizing mechanism which can be rigidly mounted to a permanent floor structure and support a seat in a manner to reduce or dampen sudden or prolonged vibrations transmitted through the permanent floor to the seat.

Still yet another object of the invention is to provide a novel seat stabilizer for resiliently mounting a seat upon a permanent floor structure in which the seat stabilizer is protected from the harmful effects of the environment and includes structure to reduce the wear between contacting components.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
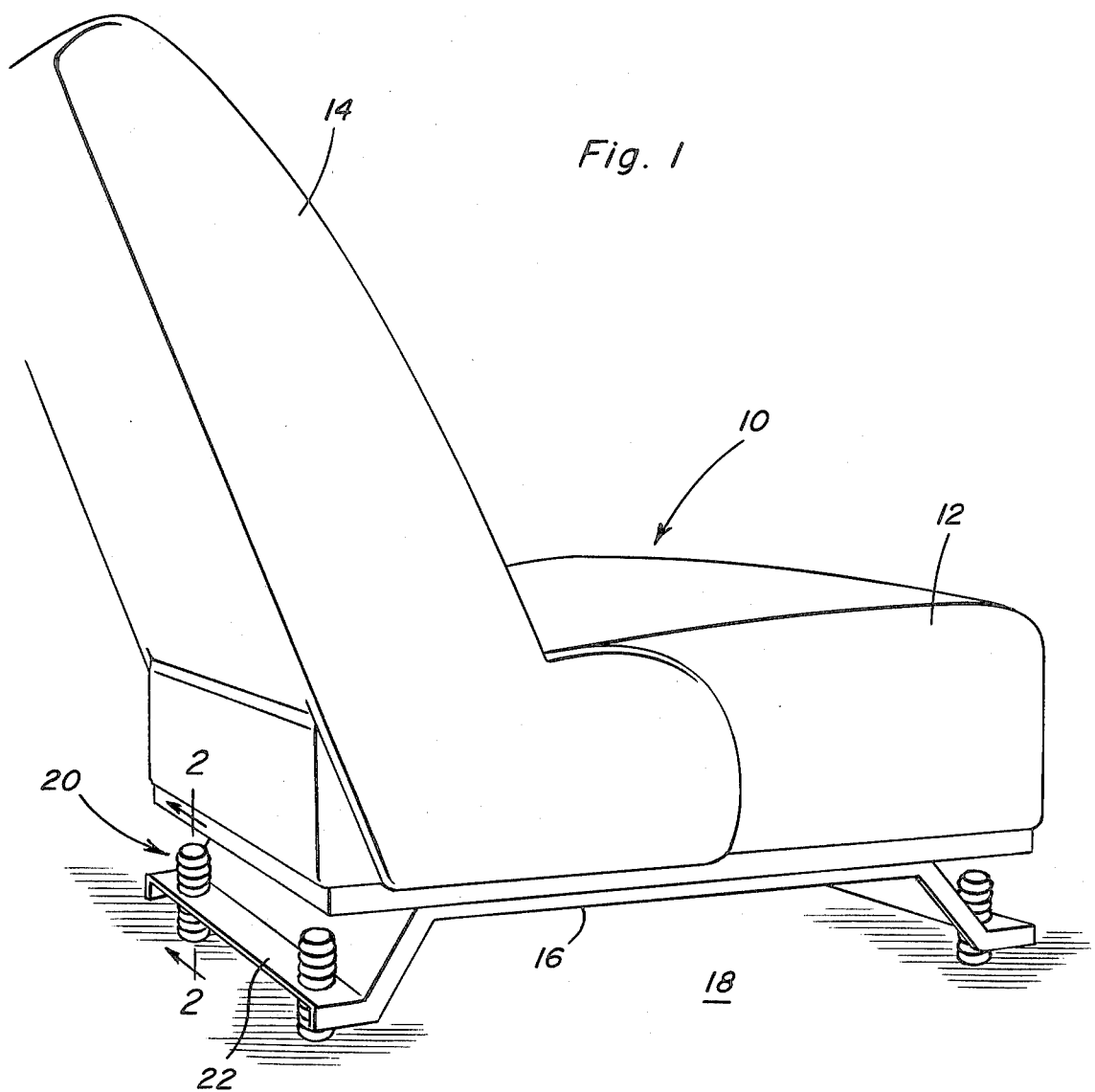
FIG. 1 is a perspective view illustrating a seat mounted on the novel seat stabilizer of the present invention.

Illustrated in FIG. 1 is seat 10 comprising seat cushion 12 and seat back 14, seat 10 being supported on seat support frame 16. Seat 10 is mounted to a permanent floor structure 18 such as exists in land vehicles including cars and trucks, aircraft, seacraft, building structures such as those on land or at sea. The novel seat stabilizer of the present invention is provided in the form of a plurality of vibration dampening means 20 rigidly secured to floor 18 and arranged about the perimeter of seat support frame 16 so as to allow seat 10 to oscillate vertically relative to permanent floor structure 18. In FIG. 1, seat support frame 16 is shown provided with an attachment flange 22 which is the means supporting seat support frame 16 and associated seat cushion 12 for vertical movement along the individual vibration dampening means 20. Of course, seat support frame 16 may be provided in other configurations quite different from the structures shown in FIG. 1. The only structure that is necessary is one that will support seat 10 on the vibration dampening means to allow the oscillating or floating movement of seat 10 whereby the shock and/or vibration transmitted through the permanent floor structure 18 is fully or substantially absorbed before reaching the upper seat structure formed by seat support frame 16 and cushion 12 and disturbing the occupant.

Figure 2:
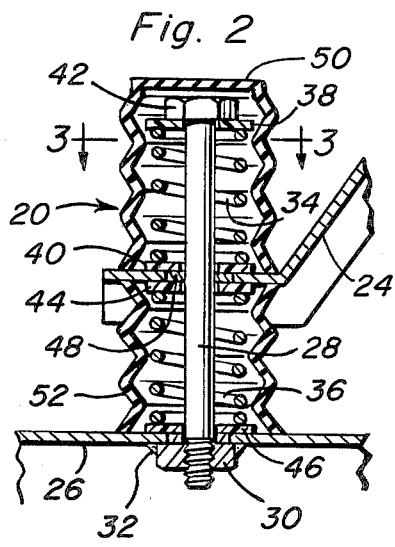
FIG. 2 is a longitudinal sectional view of a vibration dampening means taken generally along the line 2—2 of FIG. 1.
Figure 3:
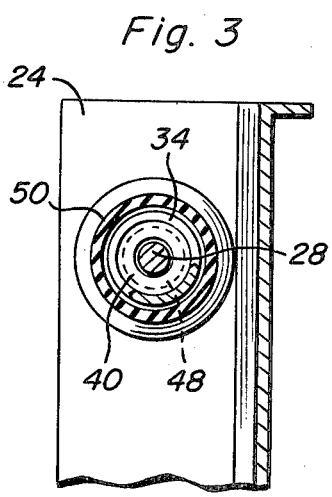
FIG. 3 is a transverse sectional view of the vibration dampening means of FIG. 2 taken generally along the line 3—3 of FIG. 2.

The structure of the individual vibration dampening means 20 is illustrated in FIGS. 2 and 3 wherein reference numeral 24 refers to the floating upper seat structure formed by attachment flange 22, seat support frame 16 and seat cushion 12 and reference numeral 26 refers to a permanent lower structure such as floor 18. Each vibration dampening means 20 is securely mounted to permanent lower structure 26 by means of central support rod 28 in the form of a threaded steel bolt secured to permanent lower structure 26 by means of self-locking steel nut 30 welded to permanent lower structure 26 at weldments 32. Positioned around and extending along the vertical portion of central support rod 28 are upper steel coil springs 34, lower steel coil spring 36 and floating upper seat structure 24 positioned between coil springs 34 and 36. Lower coil spring 36 provides controlled downward movement of floating upper seat structure 24 and thus allows seat 10 to absorb shocks or vibrations transmitted through permanent lower structure 26 without transmitting such shocks or vibrations to the body of the occupant. Likewise, upper steel coil spring 34 allows floating upper seat structure 24 to move upward in a controlled movement when floating seat upper structure 24 is forced upward by the transmitted shocks or vibrations. Upper and lower steel coil springs 34 and 36 absorb the shocks and vibrations that may occur during movement of a vehicle, the absorbed vibrations being transmitted into the upward and downward movement of the floating upper seat structure 24, thus reducing or eliminating the vibrations transmitted to the occupant of the seat. By allowing movement of upper seat structure 24 or seat support frame 16, vibrations transmitted through permanent lower structure 16 or floor 18 do not reach the occupant of seat 10 as is the case when the seat support frame is rigidly placed on the floor structure. Although coil springs placed in seat cushion 12 dampen any shocks or vibrations passing through a rigidly placed seat support frame, the vibration dampening forces of such internal springs are different from those created by the seat stabilizer of the present invention.

High density nylon washers 38 and 40 hold upper steel coil spring 34 between bolt head 42 and floating upper seat structure 24 while lower coil spring 36 is positioned around central support rod 28 by means of high density nylon washers 44 and 46 contacting floating upper seat structure 24 and permanent lower structure 26, respectively. Bushing 48 installed on floating upper seat structure 24 prevents or at least greatly reduces the wear caused by the upward and downward movement of floating upper seat structure 24 on central support rod 28. Each vibration dampening means 20 also includes a flexible rubber sleeve boot attached to floating upper seat structure 24 and enclosing central support rod 28 and associated upper and lower steel coil springs 34 and 36. The rubber sleeve boot is provided in the form of an upper boot 50 and lower boot 52. By enclosing the moving structure of vibration dampening means 20 in rubber sleeve boots 50 and 52, other wear of the moving components of vibration dampening means 20 is further prevented, such as wear caused by dust or dirt particles which can greatly increase the friction between moving components and even prevent or retard the corrosive action of the elements of nature.

Figure 4:
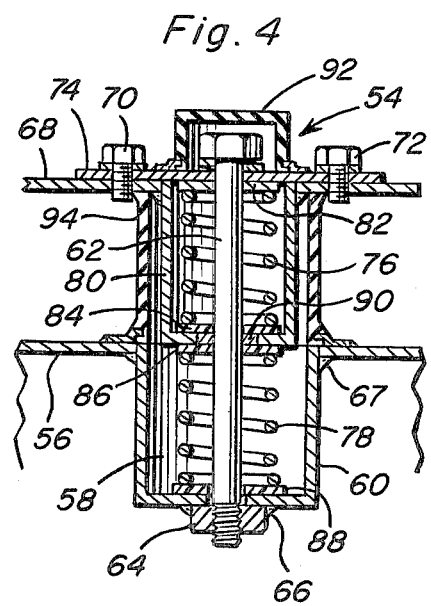
FIG. 4 is a longitudinal sectional view illustrating an alternative form of a vibration dampening means in which the permanent floor structure is provided with a recess for receiving the seat stabilizer.

FIG. 4 illustrates a similar, but alternative, vibration dampening means to the vibration means 20 illustrated in FIG. 2. The alternative vibration dampening means is generally indicated by reference numeral 54. Vibration dampening means 54 is advantageously used in areas where additional head room is required, such as the inside of a closed compartment of an automobile, truck, or aircraft. In this form of the invention, permanent lower structure 56 is provided with a recess 58 which is enclosed by steel well 60 having a depth of approximately two inches. Central support rod 62 equivalent to support rod 28 is rigidly attached to steel well 58 by selflocking nut 64 welded by weldments 66 to the outer surface of steel well 60. Steel well 60 can be welded in permanent floor structure 56 such as at weldments 67 or may be stamped or cast as an integral part of permanent floor structure 56. Reference numeral 68 refers to the floating upper seat structure which is attached to vibration dampening means 54 by means of threaded steel bolts 70 and 72 fastening upper floating seat structure 68 to steel cover plate 74. Upper and lower coil springs 76 and 78 absorb any shock or vibration and transmit the absorbed vibrations into controlled upward and downward movement of floating upper seat structure 68 in a manner equivalent to that of coil springs 34 and 36 of vibration dampening means 20. Coil springs 76 and 78 are enclosed in upper steel well 80 and lower steel well 60, respectively. If desired, upper steel well 80 may be stamped or cast as an integral part of floating upper seat structure 68. Nylon washers 82 and 84 hold coil spring 76 in place around support rod 62 while nylon washers 86 and 88 support coil spring 78 in place. Bushing 90 reduces the friction caused by the movement of upper well 80 along support rod 62 and thus greatly reduces the wear caused by the contact of these two parts. Likewise, a bushing may be placed in cover plate 74 to reduce wear which will be caused by the vertical movement. Rubber cover 92 and rubber sleeve 94 eliminate dust particles from the internal structures of vibration dampening means 54 and also eliminate the corrosive effects of environmental elements such as rain, snow, particles of dirt and corrosive elements which may exist in the environment of the vehicle seat. By mounting vibration dampening means 54 in recess 58, more head room is available for the occupant of the seat which may be supported in close quarters. Vibration dampening means 54 functions in a manner similar to vibration dampening means 20 by absorbing all shock and vibration through coil springs 76 and 78 and transmitting the vibrations passing through lower support floor 56 into movement of floating upper seat structure 68, thus eliminating or greatly reducing any shock or vibration felt by the occupant.

While vibration dampening means 20 and 54 have been described as exterior structures and ones that are apart from the seat back or seat cushions, it is certainly within the scope of the present invention that the vibration dampening means may be an integral component with the interior of the seat as long as such vibration dampening means are securely mounted to a permanent floor structure and allow the movement of the seat including seat support frame in the described manner so as to absorb sudden shocks or vibrations transmitted to the permanent floor structure and thereby maintain the comfort of the seat occupant.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A seat and seat stabilizer therefor, said seat stabilizer comprising vibration dampening means to support said seat, said vibration dampening means being secured to a permanent floor structure and supporting said seat for relative vertical movement with said floor structure, said vibration dampening means comprising a cushioning means to control relative movement of said seat, said cushioning means including coil spring means, said vibration dampening means being secured to said floor structure by a support means, said seat being mounted on said support means in a manner to provide relative movement with said support means, said coil spring means being mounted on said support means to control the movement of said seat, said support means and said coil spring means being enclosed within a flexible cover, said coil spring means being in the form of an upper coil spring and a lower coil spring, said seat being mounted on said support means between said upper and lower coil springs, a bushing mounted on said seat in contact with said support means, said bushing reducing the wear of said seat during movement relative to said support means.

2. A seat and seat stabilizer therefor, said seat stabilizer comprising vibration dampening means to support said seat, said vibration dampening means being secured to a permanent floor structure and supporting said seat for relative vertical movement with said floor structure, said vibration dampening means comprising a cushioning means to control relative movement of said seat, said cushioning means including coil spring means, said vibration dampening means being secured to said floor structure by a support means, said seat being mounted on said support means in a manner to provide relative movement with said support means, said coil spring means being mounted on said support means to control the movement of said seat, said support means and said coil spring means being enclosed within a flexible cover, said coil spring means being in the form of an upper coil spring and a lower coil spring, said seat mounted above said upper coil spring, said floor structure containing a recess, said support means being secured to said floor within said recess.

3. A seat and seat stabilizer therefor, said seat stabilizer comprising vibration dampening means to support said seat, said vibration dampening means being secured to a permanent floor structure and supporting said seat for relative vertical movement with said floor structure, said vibration dampening means comprising a cushioning means to control relative movement of said seat, said cushioning means including coil spring means, said vibration dampening means being secured to said floor structure by a support means, said seat being mounted on said support means in a manner to provide relative movement with said support means, said coil spring means being mounted on said support means to control the movement of said seat, said coil spring means being in the form of an upper coil spring and a lower coil spring, said seat being mounted on said support means between said upper and lower coil springs, and bushing means supported from said seat and held in position relative thereto by pressure exerted thereon from the lower and upper ends of said upper lower coil springs, said bushing reducing the wear of said seat during movement relative to said support means.

4. The combination of claim 3 wherein said support means also includes vertically elongated bolt means including a lower end slidably anchored relative to said floor structure and a midportion slidably received through a portion of said seat, said upper and lower coil springs being disposed about said bolt means and having lower and upper ends, respectively, bearing against said portion of said seat, the lower end of said lower spring bearing downwardly against said floor structure, the upper end of said upper spring bearing upwardly against abutment means carried by an upper end portion of said portion of said bolt means.

* * * * *